June 14, 1927.
V. LAMBERT
COFFEEPOT
Filed April 5, 1924
1,632,342
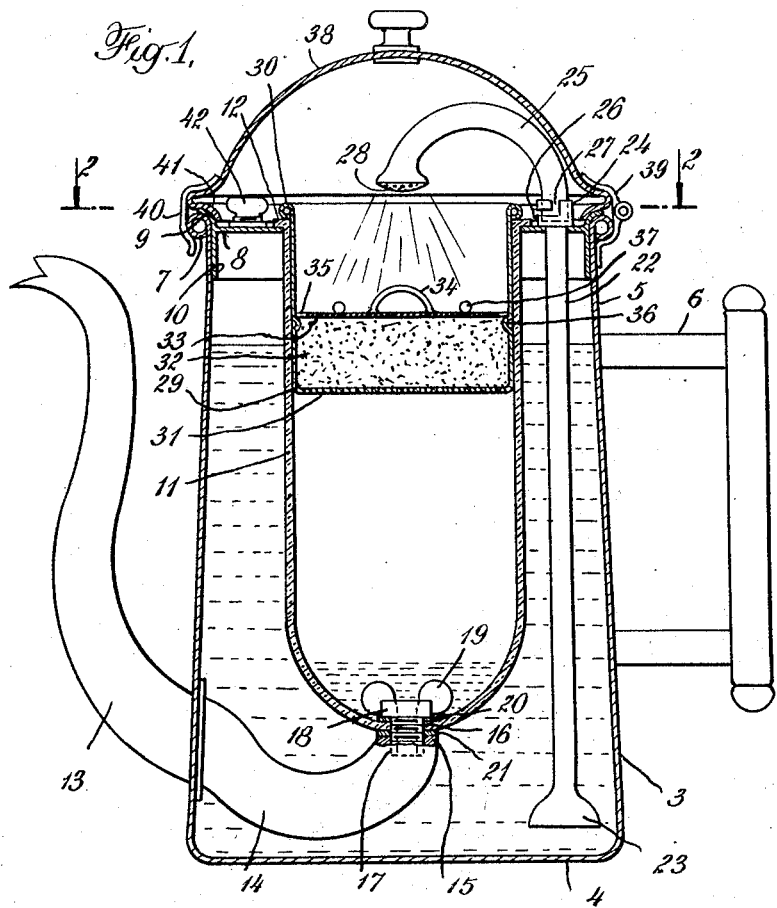
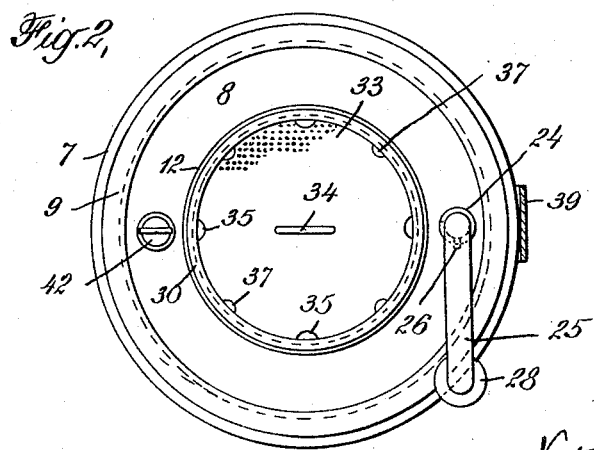
INVENTOR
Victor Lambert
BY
Pennie, Davis, Marvin & Edmonds
ATTORNEYS Patented June 14, 1927.

1,632,342

UNITED STATES PATENT OFFICE.

VICTOR LAMBERT, OF BROOKLYN, NEW YORK, ASSIGNOR TO AARON M. SLOSS, OF NEW YORK, N. Y.

COFFEEPOT.

Application filed April 5, 1924. Serial No. 704,306.

This invention relates to coffee pots such as are in ordinary domestic use, and more especially to that type of coffee pot in which the coffee is made by a process of percolation.

In pots of this type, generally known as percolators, it is customary to support the coffee, which has been ground to a considerable degree of fineness, in a suitable container or receptacle which is separated from the main body of water in the pot. This container or receptacle for the ground coffee frequently takes the form of a metal cylinder, the walls of which are perforated.
The container is supported in the pot by appropriate means, and extending through it and resting on the bottom of the pot is a tube which has inlet openings at its lower end. This tube has a discharge opening which lies above the ground coffee and when the water within the body of the pot is heated the pressure generated causes the water to be forced upwardly through the tube and to be discharged at the upper end thereof. The water so discharged from the tube flows downwardly through the body of ground coffee and thence into the main body of liquid in the pot.

Ordinarily with this type of pot, which is in common use, a quantity of cold water sufficient to make the desired number of cups of coffee is placed in the bottom of the pot, and thereafter the coffee container with its tube is put in position. The water is then heated and as steam is generated the water is forced upwardly through the tube and flows back through the coffee. This process usually continues for a considerable length of time so that the coffee liquid is repeatedly passed through the coffee granules.

It is well known that liquid coffee of the best quality is made by using the granular material ground almost to the fineness of powder, and then causing boiling hot water to pass through this granular material but once. Coffee so made has a finer flavor than that in which the liquid repeatedly passes through the granules and it is probable that such a single passage of the hot water through the granules fails to extract therefrom certain deleterious substances such as tannic acid, etc., which repeated extraction would cause to dissolve.

The object of the present invention is to provide a coffee pot so arranged that in making coffee the water used is raised to the proper boiling temperature before it is brought into contact with the granular coffee, and that this water is caused to pass but once through the granules. The liquid coffee made in this pot, therefore, results from a single extraction of the ground coffee berries and, therefore, has the desired high quality. The coffee pot constructed in accordance with this invention is made up of but a few parts which may easily be dismantled so that the pot may be kept in a sanitary condition, and these parts are strongly constructed and not subject to wear.

In that embodiment of my invention which I now prefer, I make use of a metallic vessel of the usual tapering form. This vessel may be constructed of any desired metal, depending on the commercial grade of pot that is to be made. Mounted in the upper end of the vessel is an annular member which has a flange which overlies the rim of the vessel, and another flange which extends downwardly and contacts with the inner wall of the vessel. Mounted on this annular member and extending therethrough into the vessel, is a cylindrical member having its lower end closed. This cylindrical vessel may be made of vitreous material or of enameled metal, and provides the compartment for the liquid coffee. The vessel has the usual spout which is connected by a tube to an outlet formed in the lower end of the cylindrical member, and this connection is made removable so that the cylindrical vessel may be disconnected from the spout and removed from the pot. The container for the coffee is a metallic receptacle, one wall of which may be in the form of a screen of fine mesh. A metallic cover which lies within the container serves to keep the coffee from being dislodged. At one side of the cylindrical member is mounted in the annular member a siphon tube which extends downwardly into the vessel to a point near the bottom. Connected to the upper end of the tube is a nozzle which extends over to a point centrally of the coffee compartment. The pot is provided with a cover of the usual type and a handle. With the pot so arranged, the coffee and water compartments are maintained separate, and the water compartment is closed so that the pressure generated by the steam will serve the purpose of transferring the liquid from the water compartment into the coffee compartment.

In the accompanying drawings I have illustrated a preferred embodiment of the invention, and in these drawings, Fig. 1 illustrates the improved coffee pot in vertical cross-section, Fig. 2 is a transverse cross section taken on the line 2—2 of Fig. 1.

With reference to these drawings, the pot is shown as consisting of a metallic vessel 3 which has the usual flat bottom 4 and the tapering cylindrical side wall 5. This vessel may be made of any desired material, and may be given any finish desired, such as nickle, silver plate, and the like. The vessel is provided with a handle 6 of the usual form, and its rim is formed with a bead 7 by spinning the edge of the side wall outwardly, as illustrated.

Mounted within the upper end of the vessel is an annular member 8 which has a curved flange portion 9 which is adapted to overlie the bead 7, and another flange 10 which is formed so as to lie in contact with the side wall of the vessel. Supported on the annular member is a cylindrical member 11 having its lower end closed and having a lateral flange 12 along its upper edge which overlies the edge of the annular member 8. This cylindrical member is preferably made of vitreous material such as porcelain, although it may also be made of metal with or without an enamel surface. Mounted on the vessel near the lower end thereof, is a spout 13 of the usual form, and welded or otherwise secured to the pot in communication with the support is a tube 14, the inner end of which lies just below the end of the cylindrical member 11 and is provided with an internally threaded end 15. The cylindrical member 11 is formed with an outlet 16 at its lower end and extending through this outlet is the threaded shank 17 of a bushing 18 provided with a wing nut 19 at its upper end. Inserted between the lower face of the bushing and the cylindrical member 11 is a packing washer 20 and a similar washer 21 lies between the end of the tube 15 and the outer surface of the member 11. With this arrangement the wing nut may be tightened so as to hold the tube 17 firmly in position against the end of the cylindrical member, thus making a tight connection between the interior of the member 11 and the support. The tube 14 is formed so as to have a sufficient degree of flexibility to permit the necessary flexure when the wing nut is tightened.

With this arrangement it will be seen that there is provided a compartment for liquid coffee which is altogether separate from that part of the vessel in which the water is contained, and the vessel may accordingly be said to be divided into a coffee compartment and a water compartment by a partition which is, in this case, made up of two parts, the annular member 8, and the cylindrical member 11. Also mounted at its upper end in the annular member 8 is a siphon tube 22, the lower end of which is enlarged as indicated at 23. This siphon tube extends downwardly to a point near the lower end of the water compartment and at its upper end is provided with a sleeve 24 in which is mounted the stem of a nozzle 25. This stem is provided with a stud 26 which fits in a bayonet slot 27 formed in the sleeve 24 and the slot is so arranged that the nozzle may lie either in the position indicated in Fig. 1, in which the discharge end 28 lies over the coffee compartment, or to the position indicated in Fig. 2, in which position the shank may be withdrawn from the sleeve. The nozzle 28 has a number of fine perforations formed in it.

The ground coffee, which should be used in a finely divided condition, is placed in a cylindrical container 29 which has a bead 30 formed on its upper end and is of such size that it may be freely inserted into the cylindrical member 11 with the bead supporting it in proper relation thereto. The lower wall 31 of this container is formed with minute perforations, or may, if desired, be replaced by a fine mesh screen which permits the liquid to pass therethrough but prevents the passage of the ground coffee. A perforated cover for the coffee, indicated generally at 32, is shown at 33. This cover is in the form of a disc having a handle 34 extending from its upper face and is provided with peripheral recesses 35. The container 29 is formed with a circumferential bead 36 on which the cover is to rest and above the bead it is provided with inwardly extending knobs 37 which are intended to pass through the recesses 35. The coffee is first placed in the bottom of the container and the cover is then turned so that it may be forced down against the bead 36 with the knobs passing through the recesses. The cover is then turned so that a portion of its rim between the recesses bears against the knobs, thus locking the cover in position and holding the coffee against displacement. It will be noted that in a container so formed the coffee lies at the lower end thereof a considerable distance below the discharge nozzle so that the liquid discharging from the nozzle 28 will all be received in the coffee compartment and will not splash upon the annular member 8.

The pot is provided with a domed cover 38 of the usual form, supported on the vessel by means of a hinge 39, and also provided with a retaining member 40 which is intended to snap over the bead 7. The rim of the cover is flanged inwardly as at 41, so as to rest against the flanged portion 9 of the annular member 8.

Also the annular member 8 is provided with a threaded opening in which is to be screwed a plug 42 provided with a wing nut. The opening is located opposite the point at which the siphon tube is secured in the annular member.

When the coffee pot is to be placed in use the annular member is mounted in position, as illustrated in Fig. 1, and thereafter the cylindrical member is slipped in place and its outlet secured to the inner end of the spout as shown. The coffee container is then filled and placed in the upper end of the annular member, and water is then introduced into the water compartment through the opening normally closed by the plug 42. When the water compartment has been filled to the required height to make the desired number of cups of coffee, the plug is screwed in place and the water compartment is now tight. The pot is then placed over the usual burner and the water in the water compartment is brought to a boiling temperature. As the water boils pressure is generated in the water compartment and this pressure causes water to siphon up through the tube 22 and to be discharged into the coffee compartment above the container. The siphon tube is of such size that the water passes over into the coffee compartment in small quantities, and thus passes through the mass of ground coffee slowly. By reason of the fact that the water brought into contact with this ground coffee is at the boiling temperature, and since the liquid coffee is formed simply by a single passage of the water through the granular material, the coffee made by the pot is made under the most desirable conditions and, therefore, has the best flavor and aroma. The pot is heated until as much coffee as desired has been made, but the heating may be conducted indefinitely because the end of the siphon tube lies a short distance above the bottom of the pot so that this bottom is always covered by a layer of water. The pot cannot become dry inside so that the metal will be burned.

When the pot is to be cleaned the coffee container is taken out of the cylindrical member and the ground coffee removed therefrom. The container is then sterilized by hot water and may be allowed to drain or may be dried. The coffee compartment is then cleaned by running hot water through it one or more times, and if desired the cylindrical member may be removed entirely by removing the nut 19. This removal of the cylindrical member, however, is required but infrequently. The entire pot, however, may be taken apart, as will be clear, and all parts may be given a thorough cleaning when necessary. Under ordinary conditions, however, it will be sufficient to rinse out the coffee and water compartments with hot water and sterilize the coffee container in the manner described.

I claim:

1. In a coffee pot the combination of a vessel having an opening, an annular member having a flange overlying the edges of the opening, a cylindrical member having an open end and a closed end, supported by the annular member with its closed end lying within the vessel, the two members with the vessel providing a coffee compartment within the cylindrical member and a water compartment surrounding it, means mounted in the cylindrical member for supporting granular coffee, a pipe mounted in the annular member and extending from a point near the bottom of the vessel to a point above the supported coffee, and a spout mounted in the vessel and connected with the coffee compartment.

2. In a coffee pot the combination of a vessel having an opening, a removable annular member having a flange overlying the edges of the opening and serving to close the opening partially, a cylindrical member having a flange overlying the edges of the annular member to be supported thereby, this cylindrical member having an open end and a closed end, the latter lying within the vessel, the two members and the vessel providing a coffee compartment within the cylindrical member and a water compartment which surrounds it, a container for granular coffee mounted within the cylindrical member below the open end of the latter, a pipe extending through the annular member from a point near the bottom of the water compartment to a point above the container, and a spout mounted in the wall of the vessel and connected with the interior of the cylindrical member.

3. In a coffee pot the combination of a vessel having an opening, an annular member having a flange overlying the edges of the opening, this annular member partially closing the opening, a cylindrical member having a flange resting on the annular member, the cylindrical member having an open end and a closed end, the latter lying within the vessel so that the two members and the vessel provide a coffee compartment within the cylindrical member and a water compartment which surrounds it, a container for granular coffee mounted in the upper end of the cylindrical member, an open pipe extending from a point near the bottom of the water compartment to a point above the container, a spout on the vessel connected with the interior of the cylindrical member, and a cover secured to the vessel to close the opening, this cover, when in closed position, serving to lock the annular member in position.

4. In a coffee pot the combination of a vessel having an opening, an annular member partially closing the opening and having a flange overlying the edges of the latter, a cylindrical member supported by the annular member and extending into the vessel, the cylindrical member providing a compartment for coffee which is surrounded by a compartment for water, a container for granular coffee mounted in the upper end of the cylindrical member, and a pipe mounted in the annular member and extending to a point near the bottom of the vessel, a removable spout secured to the end of the pipe and extending over the open end of the cylindrical member, and a spout on the vessel connected with the interior of the cylindrical member.

5. In a coffee pot the combination of a vessel having an opening, an annular member removably mounted in the upper end of the vessel and having a flange overlying the edges of the opening, a cylindrical member supported by the annular member and having a closed end lying within the vessel, the two members and the vessel providing a coffee compartment within the cylindrical member and a water compartment which surrounds it, a container for granular coffee mounted in the open end of the cylindrical member, a pipe extending from the lower end of the water compartment to a point above the container, a spout mounted in the wall of the vessel and connected with the interior of the cylindrical member, and a normally closed aperture in the annular member through which water may be introduced into the water compartment.

6. In a coffee pot the combination of a vessel having an opening, an annular member having a flange overlying the edges of the opening, a cylindrical member having a closed end supported by the annular member and extending into the vessel beyond the annular member, this cylindrical member forming a coffee compartment which is surrounded by a water compartment, and a cover for the opening in the vessel adapted, when in closed position, to lock the annular member against displacement.

7. In a coffee pot of the class described, the combination of a vessel having an open end and a domed cover therefor, an annular member supported by the rim of the vessel at said open end, a cylindrical member having a closed end and supported by the annular member, the cylindrical member extending into the vessel and forming a compartment for liquid coffee, an outlet in the closed end of the cylindrical member, a container for ground coffee mounted in the open end of the cylindrical member, a pipe mounted at one end in the annular member and extending into the vessel to a point near the bottom, a nozzle removably connected with the upper end of the pipe and lying beneath the cover when the latter is closed, the said nozzle discharging above the container and a spout on the vessel connected by a pipe and a removable connection with the outlet in the cylindrical member.

8. In a coffee pot of the class described, the combination of a vessel having an open end, a ring having a portion adapted to overlie the rim of the vessel and a flange adapted to contact with the side wall thereof, a cylindrical member having a closed end and a flange adapted to overlie the ring and support the member, the latter extending into the vessel beyond the ring, a container for granular coffee mounted in the cylindrical member, a pipe mounted at one end in the ring and extending into the vessel to a point near the bottom thereof, a nozzle connected to the upper end of the pipe and discharging into the cylindrical member above the container, and a spout on the vessel connected to the cylindrical member.

9. In a coffee pot, the combination of a vessel having an open end, an annular member having a flange overlying the rim of the vessel at this end, a cylindrical member having a closed end and an open end, the latter having a flange overlying the edge of the annular member to be supported thereby, a container for granular coffee mounted in the open end of the cylindrical member and having a flange overlying the edge of the latter, the granular coffee being supported at a point below the open end of the cylindrical member, a pipe mounted in the annular member and extending to a point near the bottom of the vessel, this pipe being provided with a nozzle which discharges into the cylindrical member above the granular coffee, a spout mounted on the vessel and connected with the interior of the cylindrical member, a hinged cover mounted on the vessel and adapted, when in closed position, to overlie the flange of the annular member which rests on the rim of the vessel, and means for locking the cover in closed position.

10. In a coffee pot, the combination of a vessel having an opening, an annular member having a flange overlying the edges of the opening, a cylindrical member having a flange at its upper edge overlying the edge of the annular member, removable screw-means in the bottom of the cylindrical member holding it in fixed relation to the vessel, a container for granular coffee within the cylindrical member, a pipe extending from near the bottom of the vessel to a point over the container, and an outlet in connection with the bottom of the cylindrical member.

In testimony whereof I affix my signature.

VICTOR LAMBERT.